United States Patent [19]

Hsu et al.

[11] Patent Number: 5,695,823
[45] Date of Patent: Dec. 9, 1997

[54] PREPRESS SEALER APPLICATION TECHNOLOGY BY FOAMING

[75] Inventors: Oscar Hsien-Hsiang Hsu, Lansdale, Pa.; Anthony Eugene Schiavone, Vincentown, N.J.

[73] Assignee: Rohm and Haas Company, Philadelphia, Pa.

[21] Appl. No.: 415,782

[22] Filed: Apr. 3, 1995

Related U.S. Application Data

[63] Continuation of Ser. No. 167,382, Dec. 15, 1993, abandoned.

[51] Int. Cl.$^6$ .................. B05D 3/02; B05D 3/12
[52] U.S. Cl. .................. 427/370; 427/391; 427/392; 427/393
[58] Field of Search .................. 427/208, 209, 427/370, 373, 393, 408, 412, 391, 392

[56] References Cited

U.S. PATENT DOCUMENTS

| | | | |
|---|---|---|---|
| 3,607,341 | 9/1971 | Morris et al. | |
| 4,201,802 | 5/1980 | Vande Kieft | 427/370 |
| 4,230,746 | 10/1980 | Nahta | 427/373 |
| 4,376,142 | 3/1983 | Allen | |
| 4,517,228 | 5/1985 | Matejka et al. | |
| 4,562,097 | 12/1985 | Walter et al. | 427/209 |
| 4,627,999 | 12/1986 | Hsu | 428/326 |
| 4,902,449 | 2/1990 | Hobbs | |
| 4,940,741 | 7/1990 | DeWacker et al. | 524/47 |
| 5,059,264 | 10/1991 | Sheets | 156/62.2 |
| 5,089,296 | 2/1992 | Bafford et al. | 427/208 |

FOREIGN PATENT DOCUMENTS

| | | |
|---|---|---|
| 439314 | 1/1991 | European Pat. Off. |
| 20435 | 4/1983 | Japan |

Primary Examiner—Shrive Beck
Assistant Examiner—Brian K. Talbot
Attorney, Agent, or Firm—Sudhir G. Deshmukh

[57] ABSTRACT

This invention relates to a method for preparing wood composition board, such as hard board, fabricated consolidating fibers or chips under heat and pressure to form an integral board material. More particularly, this invention relates to an improved method for applying a clear or pigmented prepress coating, also known as a prepress sealer, to the surface of a fibrous mat by converting the prepress sealer into foam prior to subjecting the mat to a temperature and pressure press treatment.

21 Claims, No Drawings

PREPRESS SEALER APPLICATION TECHNOLOGY BY FOAMING

This application is a continuation of application Ser. No. 08/167,382, filed Dec. 15, 1993, now abandoned.

FIELD OF THE INVENTION

This invention relates to a method for preparing wood composition board, such as hardboard, fabricated by consolidating fibers or chips under heat and pressure to form an integral board material.

More particularly, this invention relates to an improved method for applying a clear or pigmented prepress coating, also known as a prepress sealer, to the surface of a fibrous mat by converting the prepress sealer into foam prior to subjecting the mat to heat and pressure treatment.

Wood composition board such as, for example, hardboard, is manufactured by the reconsolidation of the de-fiberated wood chips under heat of up to 450 degrees F. and pressure up to about 1,200 psi (pounds per square inch). The fibrous particles are first formed into a unitary mat, by either a dry process or a wet process, which is then consolidated into a solid board by applying heat and pressure. Prior to the reconsolidation of the defiberated wood chips and before applying heat and pressure, compositions containing synthetic items such as polymeric dispersions, aminoplast resins, waxes, and the like, may be applied to the mat surface to increase the strength, integrity and enhanced water resistance. These compositions are referred to as "prepressed sealers".

The production of wood composition board prepared by a conventional process for preparing such products typically employ a step where the prepress sealer has to be applied to the composition board mat surface prior to the application of heat and pressure. The prepress sealer is conventionally applied to the fiber mat surface by spraying. This conventional spray method for transferring the prepress sealer to the mat surface results in significant losses of the prepress sealer into exhaust systems and air circulation systems.

Another shortcoming of applying the prepress sealer by spraying is the tendency to have an uneven distribution of prepress sealer on the board surface. This uneven application of the prepress sealer may create spots or surface discoloration in the final product, as well as increase the cost of production due to the inefficient transfer of the prepress sealer onto the mat.

In order to minimize the loss of product and to maximize the physical properties of the finished wood board, the present invention converts the sealer into a foam by employing a foaming agent and a wetting agent prior to subjecting the fibrous mat to heat and pressure.

By applying the prepress sealer using the composition and method of the present invention to the surface of fibrous mat prior to the application of heat and pressure, it is possible to obtain a finished composition board product which has superior surface properties, i.e., an absence of surface spotting caused by wood tannin, sugars or waxes. Additionally, the coating composition of the present invention exhibits excellent prepress release properties which aid in the continual removal of composition board product from the press plate after repeated applications of heat and pressure.

Another advantage of the coating composition of the present invention is that it does not carbonize under surface pressure and heat employed in preparing the composition board. In addition, the coating composition and method of the present invention allows for a more efficient and economical use of the prepress sealer. While another advantage of the foam prepress sealer of the present invention is that it allows for a more efficient use of subsequent applications of primer.

DESCRIPTION OF RELATED ART

U.S. Pat. No. 3,607,341 discloses a process for producing foam coated textiles, and similar materials are produced by (a) foaming an aqueous emulsion latex composition containing about 1.5 to about 10 parts by weight of a water-soluble salt of a saturated organic acid to increase the volume of said latex from about 4 to about 12 times its original volume; (b) applying the thus obtained foam directly to said textile or similar substrate; (c) partially drying the foam and substrate to a moisture content of less than about 20 percent by weight while retaining the foam in its extended form during the drying process without gelation or curing the polymer; (d) crushing the partially dried and uncured foam, and (e) thereafter drying and curing the resultant crushed foam.

U.S. Pat. No. 4,517,228 discloses a process for manufacturing composition boards which utilize a composition board coating having an acrylic emulsion present at 2.5 to 58% by weight solids, a platelet talc present at about 25 to 97% by weight solids, a crosslinking agent for the acrylic emulsion present at about 0.3 to 18% by weight solids and a high melting wax present at about 0.2 to 12% by weight solids level.

U.S. Pat. No. 4,376,142 discloses a method for preparing a prime-coated fiberboard product by preparing a frothed aqueous latex prime coating having a foaming agent, the frothed coating having a consistency of 500 to 700 grams per liter, applying the coating at a rate of 220 to 320 grams per square meter of fiberboard and exposing the coated fiberboard to heat, thereby collapsing the froth and drying the coating.

None of the related art references disclose, teach or suggest the use of a prepress sealer composition which contains a foaming agent and a wetting agent for application to a fibrous mat prior to the consolidation of the wood composition board by applying heat and pressure.

SUMMARY OF THE INVENTION

One aspect of the invention provides a process for preparing wood composition board by (a) foaming by air whipping an aqueous emulsion polymerized latex composition comprising a polymer of an ethylenically unsaturated monomer containing a foaming agent and a wetting agent; (b) applying the resultant polymeric foam directly to a wooden mat substrate; (c) collapsing the polymeric foam on the wooden mat substrate; and, (d) hot-pressing the foam coated wooden mat substrate to cure the polymeric coating.

Another aspect of the invention provides a wood composition board having an acrylic polymer latex wherein the latex polymer is foamed from about 4 to about 12 times of the original volume and contains from about 0.5 to about 10 weight percent of a water-soluble organic surfactant foaming agent and from about 0.2 to about 15 weight percent of a cationic, anionic, or nonionic surfactant wetting agent or mixtures thereof.

DETAILED DESCRIPTION OF THE INVENTION

One aspect of the invention provides a process for preparing wood composition board by (a) foaming by air whipping an aqueous emulsion polymerized latex composition comprising a polymer of an ethylenically unsaturated monomer containing a foaming agent and a wetting agent; (b) applying the resultant polymeric foam directly to a wooden mat substrate; (c) collapsing the polymeric foam on the wooden mat substrate; and, (d) hot-pressing the foam coated wooden mat substrate to cure the polymeric coating.

Another aspect of the invention provides a wood composition board having an acrylic polymer latex wherein the latex polymer is foamed from about 4 to about 12 times of the original volume and contains from about 0.5 to about 10 weight percent of a water-soluble organic surfactant foaming agent and from about 0.2 to about 15 weight percent of a cationic, anionic, or nonionic surfactant wetting agent or mixtures thereof.

Preparation of Composition Board

The basic process for the preparation of the composition board from defiberated wooden chips is well-known in the art. Generally, this process is disclosed in U.S. Pat. Nos. 3,098,785 and 4,238,438, which are by this reference incorporated herein.

As subsequently used herein, the phrase "wood composition board" includes various hardboard, fiberboard, particleboard, waferboard and strandboard. Also included are wet processed hardboard, dry processed hardboard and wet/dry processed hardboard, medium density fiberboard, oriented strandboard, and the like.

The general process for the preparation of composition board from defiberated wooden chips involves using wood chips or particles which are steamed, converted to fibers, formed into a mat, and hot pressed to form a hardboard or fiberboard. Usually, the wood products are fed into a wood cooker and held under pressure of up to about 200 psi for less than about 10 minutes at temperatures ranging up to somewhat less than about 400 degrees F. The steam chips are then refined into fibers which are introduced into a felting zone, where a thermosetting glue and other additives such as low melting waxes and other synthetic additives are mixed with the fiber products. In most conventional processes, these additives are mixed with fibers. The fiber mat is then produced by spraying. The problem occurs when the prepress sealer is subsequently applied to the mat surface. Conventional processes also use spraying to apply the prepress sealer to the surface of the mat. However, spraying results in an inefficient transfer of the sealer to the mat surface. Losses of the prepress sealer to the atmosphere and air ventilation and exhaust systems can be as high as about 40 percent. This results in both an economic loss of product as well as an environmentally unfriendly workplace.

After the glue and other additives are mixed with the fibers and the fibrous mat is produced, the prepress sealer is sprayed onto the surface. The wet or dry mat is then conveyed into a hot press where one or more cycles of heat and pressure are applied. In a typical operation, the mat is pressed for up to 10 seconds at 400 psi, then for four (4) minutes at 150 psi and 450 degrees F. Generally, one or more high pressure treatment steps may be employed with pressures up to about 1200 psi and temperatures from about 200 to about 600 degrees F.

Polymeric Dispersion

The basic process for the preparation of the polymeric dispersion of the present invention is well-known and is described more particularly in U.S. Pat. No. 4,517,228, which is by this reference incorporated herein.

The acrylic emulsion resin useful herein can be prepared by conventional emulsion process techniques, which involve the emulsion polymerization of various acrylic and other alpha beta ethylenically unsaturated monomers in the presence of free radical generating initiators and various surfactants or emulsification agents. These processes and products are well known in the art and will not be described further. In order to insure that the acrylic emulsions are subject to crosslinking using the crosslinking agents described hereafter, they should contain from about 1.0 to about 30 percent by weight of a carboxyl or hydroxyl functional monomer. Examples of the acid monomers include acrylic, methacrylic, ethacrylic, crotonic and itaconic acids, as well as various half acid esters or maleic and fumaric acids. The hydroxy monomers include the hydroxyalkyl acrylates and methacrylates predominantly. Also included are other acrylate-type monomers, including acrylonitrile and methacrylonitrile and other related materials. In order to adjust the Tg of the polymers prepared according to the instant invention, up to about 40 percent by weight of an alpha-beta ethylenically unsaturated aromatic monomer copolymerizable with the aforementioned acrylate and methacrylate esters can be employed. Examples of such materials include styrene and vinyl toluene. Also included are up to about 60 percent by weight of another optional monomer copolymerizable with these first monomers, such as acrylamide, methylol (meth)acrylamide and methylolated ureidoethyl methacrylate. Monomers such as vinyl acetate, vinyl versatate, and butadiene are another option. The acrylic emulsion useful herein should have a viscosity of less than 2,000 cps, preferably less than 1,000 cps, at a solids content of about 10 to about 60 percent by weight. The preferred emulsions useful herein are the anionic surfactant stabilized emulsions based upon, for example, alkylaryl sulfonates, sodium sulfosuccinate and ammonium lauryl sulfonate. Also preferred are the various polyethylene oxide and polypropylene oxide-based phenolic-type surfactant. However, the nonionic surfactant and cationic surfactant stabilized emulsions may also be employed herein.

The second essential element of the compositions of the instant invention is a melamine formaldehyde-type crosslinking agent for the acrylic emulsion. The curing agent should be water-soluble or readily water-dispersible, with or without the use of a co-solvent, and is preferably a melamine-based crosslinking agent, although urea/ formaldehyde-type curing agents may also be employed alone, or in combination with the melamine formaldehyde-type curing agents described hereafter. Basically, the crosslinking agents are preferably based upon polyalkoxymethylol melamine, with the hexamethoxymethylol melamines being most preferred. Crosslinkers such as glycourils and dimethylol-dihydroxyl ethylene urea are also considered useful in this purpose.

An optional component of the composition of the instant invention is a high-melting wax. Generally, these waxes must have a softening point in the range of above about 140 degrees F., preferably 150 degrees F. Most preferred among these waxes are waxes of the carnauba, polyethylene polymekan, micro crystalline, and the like.

Another optional component of the composition of the instant invention is a platelet, platey or micaceous form of talc. (Talc also occurs in these other forms: fibrous or foliated; acicular or tremolitic; and, nodular or steatite.) Generally, talc materials are of two types, either hydrous or anhydrous. Both based upon magnesium silicate and may have the chemical formula $Mg_3Si_4O_{10}(OH)_2$ or $3MgO.4SiO_2.H_2O$. While either material may be used, the hydrated materials are most preferred. In either event, it is crucial that the talc compositions of the instant invention be of the platelet form. In general, it is preferred that the talc compositions of the instant invention have aspect ratios (average diameter/average thickness) of about 10:1 to 30:1, preferably about 15:1 to 25:1, and that they have diameters of about 1 to about 4 micrometers and thicknesses of about 0.5 to about 0.05 micrometers, preferably diameters of about 2 micrometers and thicknesses of about 0.1 micrometers.

The compositions of the instant invention may optionally be compounded with pigments, fillers, reinforcing agents, thickeners, flow control agents, release agents and other conventional coating formulation agents. In addition, the compositions of the instant invention may contain certain acidic or basic materials to adjust the pH to the range of above about 7, preferably from about 8 to 10. Lower pH materials are less stable and often will gel prior to use. Preferably, the composition herein should be compounded employing pigment volume concentrations in the range of about 0 (zero) to about 60 percent.

Foaming Agent

It is essential that the polymerized latex emulsion produced according to the present invention contain a water-soluble surfactant. Such water-soluble surfactant functions as a foaming agent and a foaming stabilizer. It has been found that when the water-soluble surfactant consists of, or contains, a substantial amount of a water-soluble salt (or soap) of an 18 carbon atom aliphatic carboxylic acid, the foam produced may be readily processed, in accordance with the present invention, to produce a wood composition board having the desired properties. Particularly preferred are the water-soluble salts of 18 carbon atom aliphatic acid or mixtures of aliphatic carboxylic acids of from about 16 to about 20 carbon atoms, but containing a substantial amount, at least about 40%, and preferably over 50%, by weight, of an 18 carbon atom aliphatic carboxylic acid.

Examples of preferred aliphatic carboxylic acids include stearic acid, tallow fatty acids, oleic acid, and the like. Particularly preferred salts or soaps of stearic acid or of partially or fully hydrogenated fatty acids of natural origin which contain a major amount of stearic acid such as hydrogenated tallow acid, hydrogenated tall oil fatty acids, hydrogenated soy bean oil fatty acids, and hydrogenated tung acids. Preferred water-soluble salts or soaps of the above-mentioned acids are the alkali metal, usually sodium or potassium salt, the ammonium sales and the amine sales such as alkanolamine salts, e.g., mono-, di- and triethanolamine salts.

If desired, other water-soluble surfactants may be incorporated in the polymerized latex. Examples of such salts and soaps of fatty acids contain from 12–24 carbon atoms, included are salts of aliphatic or alkylary sulfonic acids of sulfates such as sodium lauryl sulfate, sodium dodecylbenzyl sulfate, and the like, as well as non-ionic surfactants such as polyethylene oxide condensates of higher fatty alcohols, higher aliphatic acids, alkylphenols, and the like. However, such auxiliary foaming agents should not be used in an amount greater than the salt of the $C_{18}$ aliphatic carboxylic acid.

It has been found that the emulsion polymerized latex composition containing from about 0.2 to about 10 weight percent, and preferably about 1.0 to about 5 weight percent of water-soluble surfactant based on fie dry weight of the polymer in the latex emulsion, are satisfactory to produce wood composition substrates having the desired properties of this invention.

The emulsion polymerized latex composition starting material may be foamed by any of the known conventional mechanical or chemical foaming processes. While it is preferred to accomplish foaming by the air whipping method due to its easy procedure and its production of very fine uniform cell structure, other methods, such as releasing a non-coagulating gas such as nitrogen, or causing the decomposition of a gas-liberating material to chemically react with an ingredient in the composition with the liberation of a non-coagulatable gas as a reaction product, or by use of an apparatus having commercially available foam heads may also be employed. These foaming processes may be carried out at around room temperature.

The key characteristic of the foam, used for manufacture of the wood composition board of the present invention, is that the foam must collapse between the time the foam is applied onto the surface of the mat and the time that the mat containing the foam comes in direct contact with the hot press plate. To accelerate the foam collapse, air blowing, heating, or applying a vacuum at the bottom of the mat immediately after the foam was laid down onto the mat surface, was found effective.

In order to produce wood composition board having the desired properties, the volume of the latex composition containing the foaming agent should be increased from about 4 to 50 times, preferably 10 to 15, times its original volume in the foaming step. The density of the foamed latex is indicative of the volume expansion. For example a density of 0.1 is equivalent of one gram of dry solid increasing the volume 10 times.

The resulting foamed polymeric latex may then be applied directly to the mat surface by any method utilized in conventional procedures, apparatus or machinery known in the art. The technique of applying the foam is not in any way critical to the practice of this invention. Once applied to the mat or substrate, the foam polymer latex may be leveled to any desired thickness, which will satisfy the ultimate thickness directed by economic consideration, the equipment used, and the desired end results. Leveling of the foam coating may be accomplished by using a doctor knife or a roll or a curtain coater, or the like.

The Wetting Agent

In preparation of the latex composition of the present invention, it is necessary to employ surfactants as wetting agents. Wetting agents are classically subdivided into three categories: anionic, cationic and nonionic surfactants.

The purpose of the wetting agent is to enhance surface wetting; to help wet surfaces which are not completely free from grease, wax or dirt; to distribute the prepress sealer uniformly on the fiber; and to collapse the foam on the fiber mat within a very short period of time before the foam is contacted with the hot press plate. The time period for collapsing the foam is generally from about 30 seconds to about two (2) minutes between the time that the foam is applied to the mat surface and the mat has contact with the heat and pressure.

In general, the cationic surfactants are the surface-active portion of the molecule bears an apparent positive charge. Examples of cationic wetting agents useful in the present invention are selected from the group consisting of $C_{12}$ to $C_{18}$ primary, secondary and tertiary amines and salts thereof, diamines, polyamines and their salts, quaternary ammonium salts, polyoxyethylenate amines, quaternized polyoxyethylenate amines, amine oxides and the like.

In general, the anionic surfactants are the surface-active portion of the molecule that bears an apparent negative charge. Examples of anionic wetting agents useful in the present invention are selected from the group consisting of alkylaryl sulfonates, disodium mono ester sulfosuccinates, disodium isodecyl sulfosuccinates, disodium ethoxylated alcohol half ester of sulfosuccinic acid, disodium ethoxylated nonyl phenol half ester of sulfosuccinates, disodium alkyl amidoethanol sulfosuccinates, disodium alkyl amido polyethoxy sulfosuccinates, disodium alkyl amidoethanol sulfosuccinates, tetrasodium N-(1,2,-dicarboxy-ethyl-)-N-octadecyl sulfosuccinates, disodium N-octadecyl sulfosuccinamate, sodium bistridecyl sulfosuccinates, sodium dioctyl sulfosuccinates, sodium dihexyl sulfosuccinates, sodium dioceyl sulfosuccinates, sodium diocyclohexyl sulfosuccinates, sodium diamyl sulfosuccinates, sodium diamyl sulfosuccinates, sodium diisobutyl sulfosuccinates, and the like.

In general, the nonionic surfactants are the surface-active molecule that bears no apparent ionic charge. Examples of nonionic wetting agents useful in the present invention are selected from the group consisting of polyoxyethylenated alkylphenols, alkylphenol ethoxylates, polyoxyethylenated straight-chain alcohol, amine polyglycol condensate, modified polyethoxy adducts, polyoxyethylenated mercaptans, long chain carboxylic acid esters, modified terminated alkylaryl ether, and alkylpolyether alcohols, and the like.

It has been found that the emulsion polymerized latex compositions contain levels of anionic and/or cationic and/or nonionic surfactants and mixtures thereof from about 0.2 weight per cent to about 15 weight per cent. Preferably, the levels of anionic, cationic and nonionic surfactants are from about 0.5 weight per cent to about 5 weight per cent based on the total latex solids.

Defoaming Technology

It is critical to the process of the present invention, as discussed above, to have the foamed latex polymer collapse at the appropriate time. Additionally, it is also critical to select appropriate foaming and wetting agents in the practice of the present invention. However, mechanical means such as, for example, heat, vacuum, air blowing or ultra sonic, offer an addition alternative to collapse the foam.

The examples which follow are intended to further illustrate the concept of the present invention but should not be taken in any aspect whatsoever to limit the scope of such which is more directly and specifically defined by the claims.

EXAMPLES

Examples 1–5

Clear acrylic emulsion foams in Examples 1–5 were evaluated for ease of foaming, foam density, pore size and time of foam collapsion. The composition used in these Examples are given in the following table.

|  | Examples | | | | |
|---|---|---|---|---|---|
|  | 1 | 2 | 3 | 4 | 5 |
|  | (part by weight) | | | | |
| Rhoplex E-2893 | 100 | 100 | 100 | 100 | 100 |
| Sipon L-22 (foaming agent) | 0 | .5 | 1.0 | 2.0 | 4.0 |
| Triton GR-5M (wetting agent) | 0 | .2 | .4 | .6 | .8 |
| Water | 123 | 123 | 123 | 123 | 123 |

Rhoplex E-2893 is a waterborne acrylic latex manufactured by Rohm and Haas Co.
Sipon L-22 is an aqueous solution of ammonium lauryl sulfate in 28% solid, manufactured by Rhone-Poulenc Co.
Triton GR-5M is anionic surfactant, manufactured by Union Carbide Co.

Properties of the foams show as follows:

| Examples | 1 | 2 | 3 | 4 | 5 |
|---|---|---|---|---|---|
| Ease of Foaming | fair | good | very | very | extreme |
| Foam Size | not uniform | not uniform | uniform | uniform | uniform |
| Foam Quality | unstable | unstable | stable | stable | stable |

Examples 1 indicates that without a foaming agent and a wetting agent, the foam size is not uniform, and the foam quality is not stable.

Examples 6–10

Pigmented prepress sealer foams in Examples 6–10 were evaluated for their ease of foaming, foam density, pore size, time of foam collapsion and press release performance after the coated boards were hot-pressed.

The composition used in these examples are given the following table.

|  | Examples | | | | |
|---|---|---|---|---|---|
|  | 6 | 7 | 8 | 9 | 10 |
|  | (part by weight) | | | | |
| Pigmented In-press Coating (610-D5-111) | 100 | 100 | 100 | 100 | 100 |
| Sipon L-22 (foaming agent) | .5 | .5 | .5 | .5 | .5 |
| Triton GR-5M (wetting agent) | 0 | .1 | .2 | .3 | .4 |
| Water | 135 | 135 | 135 | 135 | 135 |

610-D5-111 in-press coating is manufactured by Akzo Coatings Co.
Sipon L-22 is an aqueous solution of ammonium lauryl sulfate in 28% solid, manufactured by Rhone-Poulenc Co.
Triton GR-SM is anionic surfactant, manufactured by Union Carbide.

Properties of the foams and performance of the foam-coated boards

| Examples | 6 | 7 | 8 | 9 | 10 |
|---|---|---|---|---|---|
| Ease of Foaming | good | good | good | good | good |
| Foam Density g/cm³ | 0.06 | 0.05 | 0.05 | 0.05 | 0.05 |
| Foam Quality | uniform | uniform | uniform | uniform | uniform |
| Board released from press | 8 | 9 | 10 | 10 | 10 |

Press release:
10: automatic release from the hot-press plate
9: momentary sticking automatic release
8: must tap to release from the hot-press
0: cannot be released Examples 6 and 7 show that with a foaming agent and insufficient wetting agent, the press release performance was unsatisfactory. Examples 8 and 10 provide satisfactory press release.

Example 11–13

Foams in Example 11–13 were prepared in the same way as Example 10 except for changing the foaming agent.

|                                          | Examples |       |       |
|------------------------------------------|----------|-------|-------|
|                                          | 11       | 12    | 13    |
|                                          | (parts by weight) | | |
| Pigmented In-press Coating (610-D5-120)  | 100      | 100   | 100   |
| Stanfax-320 (foaming agent)              | .5       |       |       |
| Triton W-30 (foaming agent)              |          | .5    |       |
| Monamid-150 ADD (foaming agent)          |          |       | .5    |
| Triton GR-5M (wetting agent)             | .2       | .2    | .2    |
| Water                                    | 135      | 135   | 135   |
| Ease of Foaming                          | good     | good  | good  |
| Foam density (g/cm$^3$)                  | 0.06     | 0.05  | 0.10  |
| Foam size                                | uniform  | uniform | uniform |
| Board released from press                | 10       | 10    | 10    |

Stanfax 320 is Ammonium Stearate, manufactured by Adhesive & Chemical Co.

Triton W-30 and Triton GR-5M are Sodium alkylaryl ether sulfate and Dioctyl sodium sulfosuccinate respectively, manufactured by Union Carbide.

Monamid-150 ADD is fatty add-alkanolamide, manufactured by Mona Industries, Inc.

Examples 14–16

Foams were prepared in the same way as Example 9 except for changing wetting agent.

|                                          | Examples |       |       |
|------------------------------------------|----------|-------|-------|
|                                          | 14       | 15    | 16    |
|                                          | (parts by weight) | | |
| Pigmented In-press Coating (610-D5-120)  | 100      | 100   | 100   |
| Sipon L-22 (foaming agent)               | 3.0      | 3.0   | 3.0   |
| Triton X-405 (nonionic) (wetting agent)  | 1.0      |       |       |
| Triton CR-5M (anionic) (wetting agent)   |          | 1.0   |       |
| Fluorad FC-135 (cationic) (wetting agent)|          |       | .3    |
| Ease of foaming                          | good     | good  | good  |
| Foam density (g/cm$^3$)                  | 0.05     | 0.04  | 0.06  |
| Foam size                                | uniform  | uniform | uniform |
| Boards released from press               | 10       | 10    | 10    |

Triton X-405 is Octyl phenoxy polyethoxy ethanol, manufactured by Union Carbide.

Triton GR-5M is Dioctyl sodium sulfosuccinate, manufactured by Union Carbide.

FC-135 is Fluoroalkyl quaternary ammonium iodide, manufactured by 3M Co.

Examples 17–20

Foams in Examples 17–20 were prepared the same way as Example 15 with different levels of coating on the boards.

|                                          | Examples |       |       |       |
|------------------------------------------|----------|-------|-------|-------|
|                                          | 17       | 18    | 19    | 20    |
| Amount of Add-on dry film thickness 0.001 inch | .5 | 1.0 | 2.0 | 4.0 |
| Press released Performance               | 10       | 10    | 10    | 10    |

|                                          | Examples |       |       |       |
|------------------------------------------|----------|-------|-------|-------|
|                                          | 17       | 18    | 19    | 20    |
| Hiding                                   | 2        | 7     | 10    | 10    |
| Water permeation                         | 15       | 8     | 6     | 4     |
| Tape adhesion (%)                        | 85       | 20    | 8     | 0     |

Hiding: 10: perfect hiding, 0 (zero): no hiding

Water permeation: grams per sq inch per 24 hrs. of water pass through the film and retained in boards.

Tape adhesion: percent fiber pulled using 3M, #250 tape with 90 degree to the surface abrupt pull. 0 (zero) percent pull is a perfect adhesion, 100 percent pull is indicative of total failure.

We claim:

1. A process for preparing wood composition board which comprises (a) foaming by air whipping an aqueous emulsion polymerized latex composition comprising a polymer of an ethylenically unsaturated monomer containing a water-soluble surfactant foaming agent, a polyalkoxymethylol melamine crosslinking agent, and a wetting agent; (b) applying the resultant polymeric foam directly to a wooden mat substrate produced from wood fibers; (c) collapsing the polymeric foam on the wooden mat substrate in about 30 seconds to about 2 minutes; and, (d) hot-pressing the foam-coated wooden mat substrate to cure the polymeric coating and prepare said wood composition board.

2. The process according to claim 1 wherein the latex is an acrylic latex polymer.

3. The process according to claim 2 wherein the latex polymer is foamed from about 4 to about 50 times the original volume.

4. The process of claim 3 wherein the acrylic latex polymer contains from about 0.2 weight percent to about 10 weight percent of said water-soluble surfactant foaming agent, based on the dry weight of said latex polymer.

5. The process of claim 4 wherein the water-soluble surfactant foaming agent is selected from the group consisting of alkali metal, ammonium and amine salts of $C_{12}$–$C_{24}$ aliphatic carboxylic acids, and mixtures thereof.

6. The process of claim 5 wherein the acrylic latex polymer contains from about 1.0 to about 5 weight percent of the water-soluble surfactant foaming agent, based on the dry weight of said latex polymer.

7. The process of claim 6 wherein the water-soluble organic surfactant foaming agent is a ammonium lauryl sulfate.

8. The process of claim 2 wherein the acrylic latex polymer contains a surfactant wetting agent selected from the group consisting of a cationic, anionic, nonionic surfactant wetting agent and mixtures thereof.

9. The process of claim 8 wherein the cationic surfactant wetting agent is selected from the group consisting of $C_{12}$ to $C_{18}$ primary, secondary and tertiary amines and salts thereof, diamines, polyamines and their salts, quaternary ammonium salts, polyoxyethylenate amines, quaternized polyoxyethylenate amines and amine oxides.

10. The process of claim 9 wherein the anionic surfactant wetting agent is selected from the group consisting of alkylaryl sulfonates, disodium mono ester sulfosuccinates, disodium isodecyl sulfosuccinates, disodium ethoxylated alcohol half ester of sulfosuccinic acid, disodium ethoxylated nonyl phenol half ester of sulfosuccinates, disodium alkyl amidoethanol sulfosuccinates, disodium alkyl amido polyethoxy sulfosuccinates, disodium alkyl amidoethanol sulfosuccinates, tetrasodium N-(1,2,-dicarboxy-ethyl-)-N- octadecyl sulfosuccinates, disodium N-octadecyl sulfosuccinates, sodium bistridecyl sulfosuccinates, sodium dioctyl sulfosuccinates, sodium dihexyl sulfosuccinates, sodium dioctyl sulfosuccinates, sodium diocyclohexyl sulfosuccinates, sodium diamyl sulfosuccinates, sodium diamyl sulfosuccinates and sodium diisobutyl sulfosuccinates.

11. The process of claim 9 wherein the nonionic surfactant wetting agent is selected from the group consisting of polyoxyethylenated alkylphenols, alkylphenol ethoxylates, polyoxyethylenated straight-chain alcohol, amine polyglycol condensate, polyoxyethylenated mercaptans, long chain carboxylic acid esters, and alkylpolyether alcohols.

12. The process of claim 9 wherein the acrylic latex polymer contains from about 0.2 to about 15 weight percent of the anionic, cationic or nonionic surfactant wetting agent, based on the total formulation solids.

13. The process of claim 1 wherein the substrate is selected from the group consisting of hardboard, fiberboard, particleboard, waferboard, and strandboard, wet processed hard board, dry processed hardboard, wet/dry processed hardboard, medium density fiber-board and oriented strandboard.

14. The process of claim 13 wherein the substrate is fiber board.

15. The process of claim 14 wherein the fiberboard contains the foamed polymeric composition of claim 1.

16. The process of claim 1 further comprising accelerating said step of collapsing said polymeric foam on said wooden mat by applying vacuum at the bottom of said mat.

17. The process of claim 1 further comprising adding a pigment in said aqueous emulsion polymerized latex composition.

18. A process for producing a wood composition board comprising:

converting wood chips into fibers;

mixing a thermosetting glue and additives with said fibers to produce a fiber mat;

foaming a polymerized latex emulsion of a viscosity of less than 2,000 cps comprising a polymer of an ethylenically unsaturated monomer, a polyalkoxymethylol melamine crosslinking agent, a pigment, a foaming agent selected from the group consisting of alkali metal, ammonium and amine salts of $C_{12}$–$C_{24}$ aliphatic carboxylic acids, and mixtures thereof and a wetting agent selected from the group consisting of a cationic, anionic, nonionic surfactant wetting agent and mixtures thereof;

applying on the surface of said fiber mat a layer of said foamed polymerized latex emulsion;

wetting the surface of said fiber mat to uniformly distribute said foamed layer thereon;

collapsing said foamed layer on said surface of said fiber mat after said surface is wetted by said foamed layer for about 30 seconds to about 2 minutes before said fiber mat is contacted with a hot press plate of a hot press; and hot-pressing said fiber mat having said collapsed layer thereon in said hot press through one or more cycles of heat and pressure to produce said wood composition board.

19. The process of claim 18 further comprising accelerating said step of collapsing said layer on said fiber mat by applying vacuum at the bottom of said mat.

20. A process of claim 1 wherein said crosslinking agent further comprises glycourils or dimethylol-dihydroxyl ethylene urea.

21. A process of claim 19 wherein said crosslinking agent further comprises glycourils or dimethylol-dihydroxyl ethylene urea.

* * * * *